United States Patent
Yang et al.

(10) Patent No.: US 7,203,079 B2
(45) Date of Patent: Apr. 10, 2007

(54) SWITCHING CONTROLLER HAVING FREQUENCY HOPPING FOR POWER SUPPLIES

(75) Inventors: Ta-yung Yang, Milpitas, CA (US); Guo-Kiang Hung, Sindian (TW); Song-Yi Lin, Taipei (TW)

(73) Assignee: System General Corp., Taipei Shien (TW)

( * ) Notice: Subject to any disclaimer, the term of this patent is extended or adjusted under 35 U.S.C. 154(b) by 254 days.

(21) Appl. No.: 10/898,389

(22) Filed: Jul. 23, 2004

(65) Prior Publication Data

US 2006/0017426 A1    Jan. 26, 2006

(51) Int. Cl.
*H02M 1/12* (2006.01)
(52) U.S. Cl. .......................................... 363/41; 323/283
(58) Field of Classification Search .................. 363/16, 363/21.01, 21.11, 21.18, 26, 41; 323/231, 323/283, 284, 285; 455/255, 258, 264

See application file for complete search history.

(56) References Cited

U.S. PATENT DOCUMENTS 5,590,033 A * 12/1996 Kawano ...................... 363/41
2004/0092242 A1 * 5/2004 Endo .......................... 455/264

* cited by examiner

*Primary Examiner*—Jessica Han
(74) *Attorney, Agent, or Firm*—J.C. Patents

(57) ABSTRACT

A switching controller having frequency hopping is used for reducing the EMI of a power supply. A pattern generator generates a digital pattern code in response to a clock signal. An oscillator generates an oscillation signal for determining a switching frequency of a switching signal. A programmable capacitor coupled to the oscillator modulates the switching frequency in response to the variation of the digital pattern code. An attenuator connected to a voltage feedback loop attenuates a feedback signal. The feedback signal controls the pulse width of the switching signal. A programmable resistor coupled to the attenuator determines an attenuation rate of the attenuator in response to the digital pattern code. The attenuation rate is increased as the switching frequency increases. The pulse width of the switching signal is thus reduced, which compensates the decrease of the switching period and keeps the output power and the output voltage constant.

7 Claims, 6 Drawing Sheets

SWITCHING CONTROLLER HAVING FREQUENCY HOPPING FOR POWER SUPPLIES

BACKGROUND OF THE INVENTION

1. Field of the Invention

The present invention relates to a power supply, and more specifically relates to the control of a switching mode power supply.

2. Description of Related Art

Power supplies have been used to convert an unregulated power source to a regulated voltage or current. FIG. 1 shows a traditional power supply, in which a PWM controller 10 generates a switching signal $V_{PWM}$ for switching a transformer 11 via a transistor 20. The duty cycle of the switching signal $V_{PWM}$ determines the power delivered from an input of a power source to an output of the power supply. Although the switching technology reduces the size of the power supply, switching devices generate electric and magnetic interference (EMI) that interferes the power source. An EMI filter 15 equipped at an input of the power supply is utilized to reduce the EMI. However, the EMI filter 15 causes power consumption and increases the cost and the size of the power supply. In recent development, many prior arts have been proposed to reduce the EMI by using frequency modulation or frequency hopping. For example, "Effects of Switching Frequency Modulation on EMI Performance of a Converter Using Spread Spectrum Approach" by M. Rahkala, T. Suntio, K. Kalliomaki, APEC 2002 (Applied Power Electronics Conference and Exposition, 2002), 17-Annual, IEEE, Volume 1, 10–14, March, 2002, Pages: 93–99. However, the disadvantage of the prior art is that frequency modulation generates undesirable ripple signal at the output of the power supply. The undesirable ripple signal generated by frequency modulation could be realized by the following description. An output power $P_O$ of the power supply is the product of an output voltage $V_O$ and an output current $I_O$ of the power supply, which is given by, $$P_O = V_O \times I_O = \eta \times P_{IN} \quad (1)$$

An input power $P_{IN}$ of the transformer 11 and a switching current $I_P$ can be respectively expressed by, $$P_{IN} = \frac{1}{2 \times T} \times L_P \times I_P^2$$

$$I_P = \frac{V_{IN}}{L_P} \times T_{ON}$$

Where $\eta$ is the efficiency of the transformer 11; $V_{IN}$ is an input voltage of the transformer 11; $L_P$ is a primary inductance of the transformer 11; T is a switching period of the switching signal $V_{PWM}$; $T_{ON}$ is an on-time of the switching signal $V_{PWM}$.

The equation (1) can be rewritten as, $$P_O = \eta \times \frac{V_{IN}^2 \times T_{ON}^2}{2 \times L_P \times T} \quad (2)$$

The switching period T varies according to frequency modulation. As shown in equation (2), the output power $P_O$ will vary as the switching period T varies. Therefore, an undesirable ripple signal will be generated as the output power $P_O$ varies.

An object of the present invention is to provide a switching controller having switching frequency hopping to reduce the EMI for a power supply, in which the switching controller of the present invention will not generate the undesired ripple signal at the output of the power supply.

SUMMARY OF THE INVENTION

A switching controller having frequency hopping for power supplies according to the present invention includes a clock generator for generating a clock signal. A pattern generator generates a digital pattern code in response to the clock signal. An oscillator produces an oscillation signal to determine a switching frequency of a switching signal. A programmable capacitor coupled to the oscillator is utilized to modulate the switching frequency in response to the digital pattern code. An attenuator is connected to a voltage feedback loop for attenuating a feedback signal, in which the feedback signal is utilized to control the pulse width of the switching signal and to control the output power of the power supply. A programmable resistor is connected to the attenuator for programming an attenuation rate of the attenuator in response to the digital pattern code. The attenuation rate is increased as the switching frequency increases. The pulse width of the switching signal is thus reduced, which compensates the decrease of the switching period and keeps the output power and output voltage of the power supply constant.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
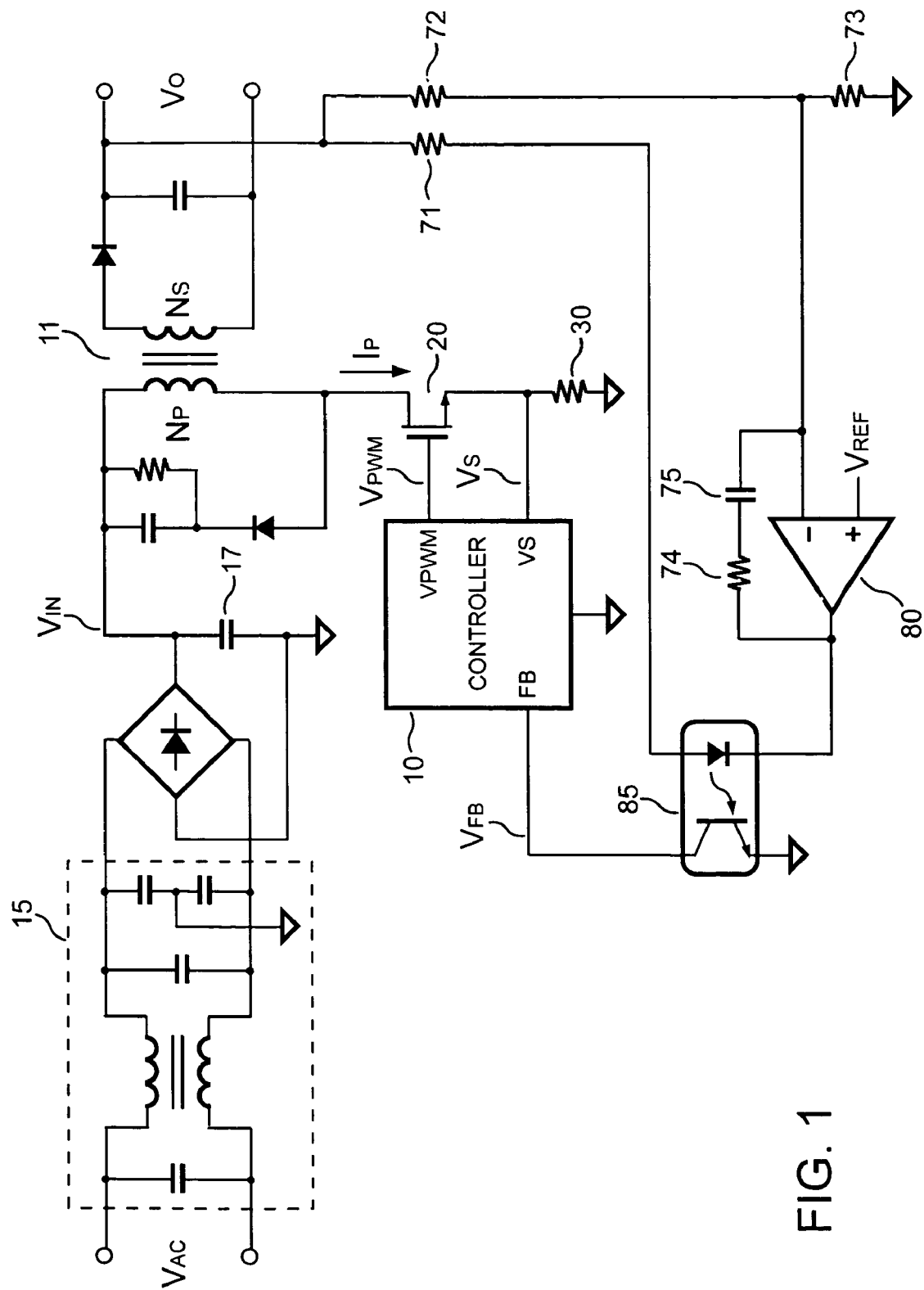
FIG. 1 shows a traditional power supply having an EMI filter.

FIG. 1 shows a traditional power supply having an EMI filter. A PWM controller 10 modulates the pulse width of a switching signal $V_{PWM}$ in response to a feedback signal $V_{FB}$. The feedback signal $V_{FB}$ is obtained from an optical-coupler 85. An operational amplifier 80 and a reference voltage $V_{REF}$ form an error amplifier to drive the optical-coupler 85.

Resistors 72, 73 and the error amplifier form a voltage feedback loop to regulate an output voltage $V_O$ of the power supply. A switching current $I_P$ of a transformer 11 is converted to a switching-current signal $V_S$ through a sense resistor 30. The switching-current signal $V_S$ is provided to the PWM controller 10 for the pulse width modulation of the switching signal $V_{PWM}$.

Figure 2:
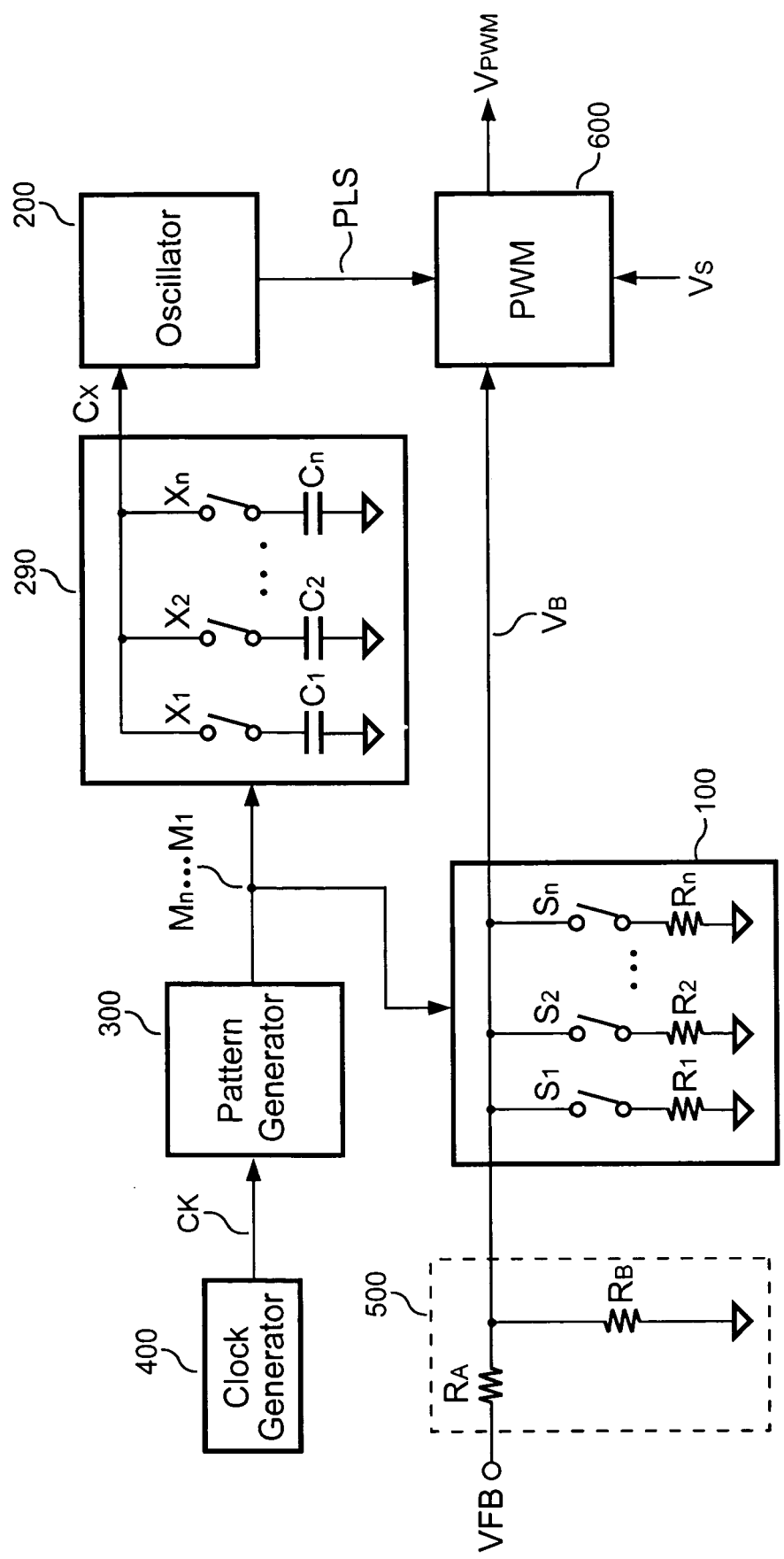
FIG. 2 shows an embodiment of a switching controller having frequency hopping according to the present invention.

FIG. 2 is an embodiment of a switching controller having frequency hopping according to the present invention. A clock generator 400 generates a clock signal CK. A pattern generator 300 is utilized to generate a digital pattern code $[M_n \ldots M_1]$ in response to the clock signal CK. An oscillator 200 is used for determining a switching frequency of the switching signal $V_{PWM}$. The switching signal $V_{PWM}$ is synchronized with the clock signal CK. A programmable capacitor 290 is coupled to the oscillator 200 for modulating the switching frequency in response to the digital pattern code $[M_n \ldots M_1]$. A resistor $R_A$ and a resistor $R_B$ develop an attenuator 500. The resistor $R_A$ is coupled to the voltage feedback loop for attenuating the feedback signal $V_{FB}$, in which a first terminal of the resistor $R_A$ is supplied with the feedback signal $V_{FB}$. The feedback signal $V_{FB}$ is utilized to control the pulse width of the switching signal $V_{PWM}$ via a PWM control circuit 600 and therefore control the output power of the power supply. A second terminal of the resistor $R_A$ is connected to a first terminal of the resistor $R_B$. A second terminal of the resistor $R_B$ is connected to a ground reference level. A voltage $V_B$ at the first terminal of the resistor $R_B$ is outputted from an output of the attenuator 500. A programmable resistor 100 is connected to the output of the attenuator 500 for programming an attenuation rate of the attenuator 500 in response to the digital pattern code $[M_n \ldots M_1]$. The attenuation rate is increased whenever the switching frequency increases. The pulse width of the switching signal $V_{PWM}$ is thus reduced, which compensates the decrease in the switching period and keeps the output power and output voltage of the power supply constant.

The programmable resistor 100 comprises switching-resistor sets connected to each other in parallel, in which the switching-resistor sets are formed by resistors $R_1, R_2, \ldots, R_n$ and switches $S_1, S_2, \ldots S_n$. The switch $S_1$ and the resistor $R_1$ are connected in series. The switch $S_2$ and the resistor $R_2$ are connected in series. The switch $S_n$ and the resistor $R_n$ are connected in series. The digital pattern code $[M_n \ldots M_1]$ controls switches $S_1, S_2, \ldots S_n$.

The programmable capacitor 290 comprises switching-capacitor sets connected to each other in parallel, in which the switching-capacitor sets are formed by capacitors $C_1, C_2, \ldots, C_n$ and switches $X_1, X_2, \ldots X_n$. The switch $X_1$ and the capacitor $C_1$ are connected in series. The switch $X_2$ and the capacitor $C_2$ are connected in series. The switch $X_n$ and the capacitor $C_n$ are connected in series. The digital pattern code $[M_n \ldots M_1]$ controls switches $X_1, X_2, \ldots X_n$.

Figure 3:
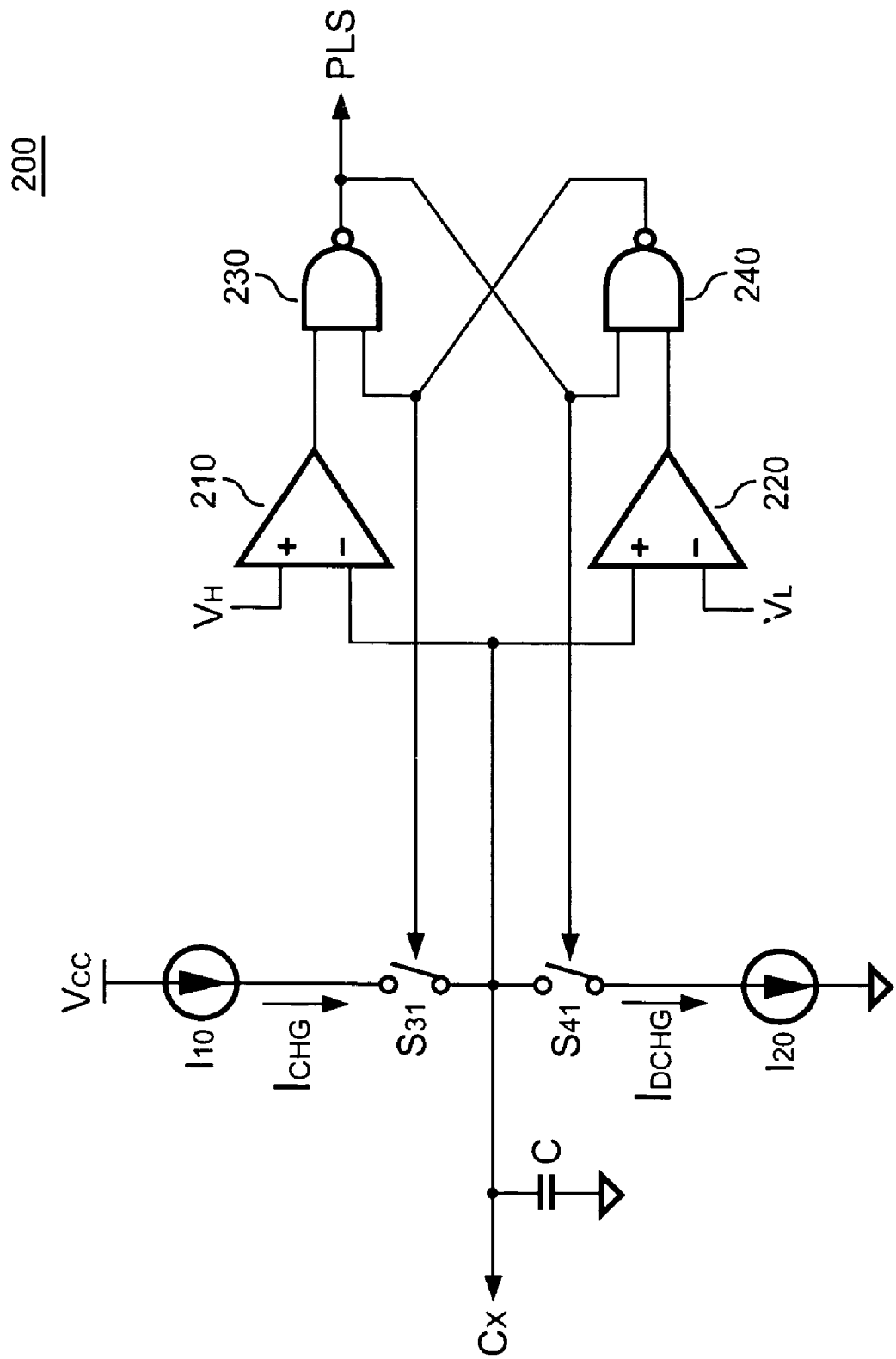
FIG. 3 shows an embodiment of an oscillator according to the present invention.

FIG. 3 shows an embodiment of the oscillator 200 according to the present invention. A current source $I_{10}$ produces a charge current $I_{CHG}$. A current source $I_{20}$ produces a discharge current $I_{DCHG}$.

A charge switch $S_{31}$ is connected between the current source $I_{10}$ and a capacitor C. A discharge switch $S_{41}$ is connected between the capacitor C and the current source $I_{20}$. A comparator 210 has a positive input supplied with a threshold voltage $V_H$. A negative input of the comparator 210 is connected to the capacitor C. A comparator 220 has a negative input supplied with a threshold voltage $V_L$. The threshold voltage $V_H$ is higher than the threshold voltage $V_L$. The positive input of the comparator 220 is connected to the capacitor C. An output of a NAND gate 230 generates an oscillation signal PLS to turn on/off the discharge switch $S_{41}$. A first input of the NAND gate 230 is driven by an output of the comparator 210. Two inputs of a NAND gate 240 are respectively connected to the output of the NAND gate 230 and an output of the comparator 220. The output of the NAND gate 240 is connected to a second input of the NAND gate 230 and turns on/off the charge switch $S_{31}$.

Figure 4:
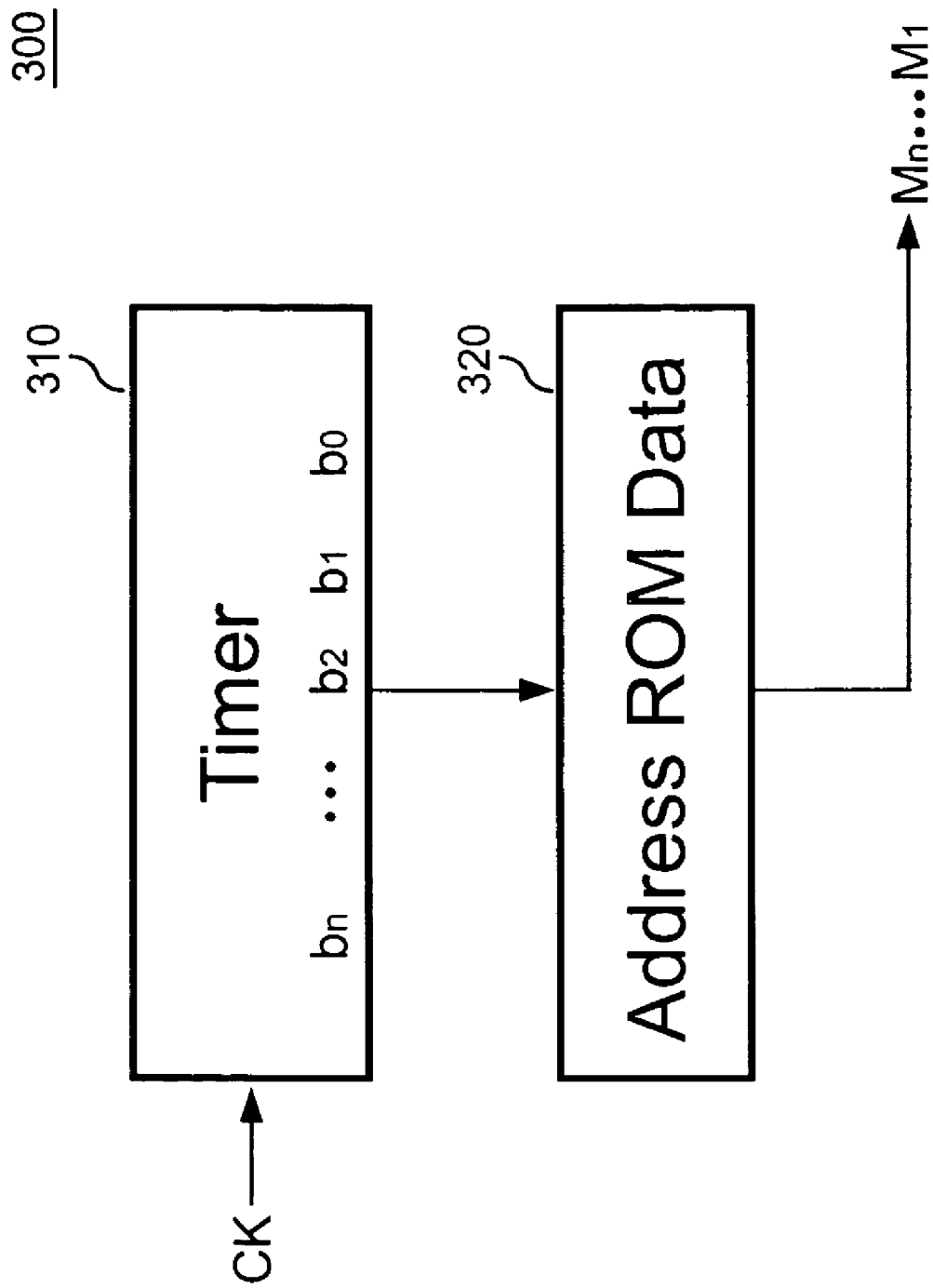
FIG. 4 shows an embodiment of a pattern generator according to the present invention.

FIG. 4 shows an embodiment of the pattern generator 300 according to the present invention. A timer 310 generates a binary code $[b_n \ldots b_0]$ in response to the clock signal CK. A read-only-memory 320 generate the digital pattern code $[M_n \ldots M_1]$ in response to the binary code $[b_n \ldots b_0]$. The address inputs of the read-only-memory 320 are driven by the output of the timer 310.

Figure 5:
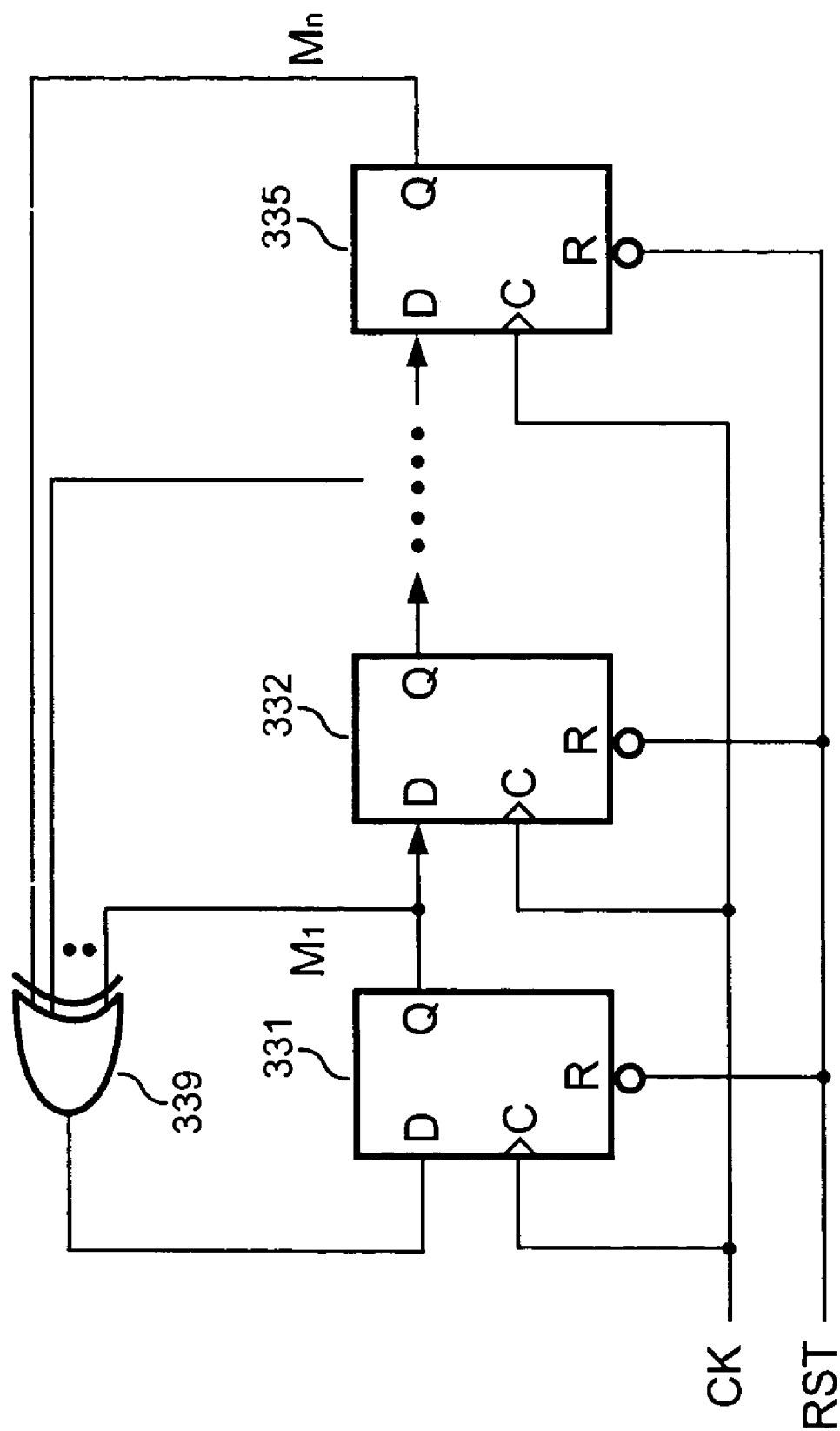
FIG. 5 shows another embodiment of the pattern generator according to the present invention.

FIG. 5 shows another embodiment of the pattern generator 300 according to the present invention. A plurality of registers 331, 332 ... 335 and a XOR gate 339 develop a linear shift register for generating a linear code in response to the clock signal CK. The inputs of the XOR gate 339 determine the polynomials of the linear shift register and decide the output of the linear shift register. Furthermore, the digital pattern code $[M_n \ldots M_1]$ can be adopt from the part of the linear code to optimize the application.

Figure 6:
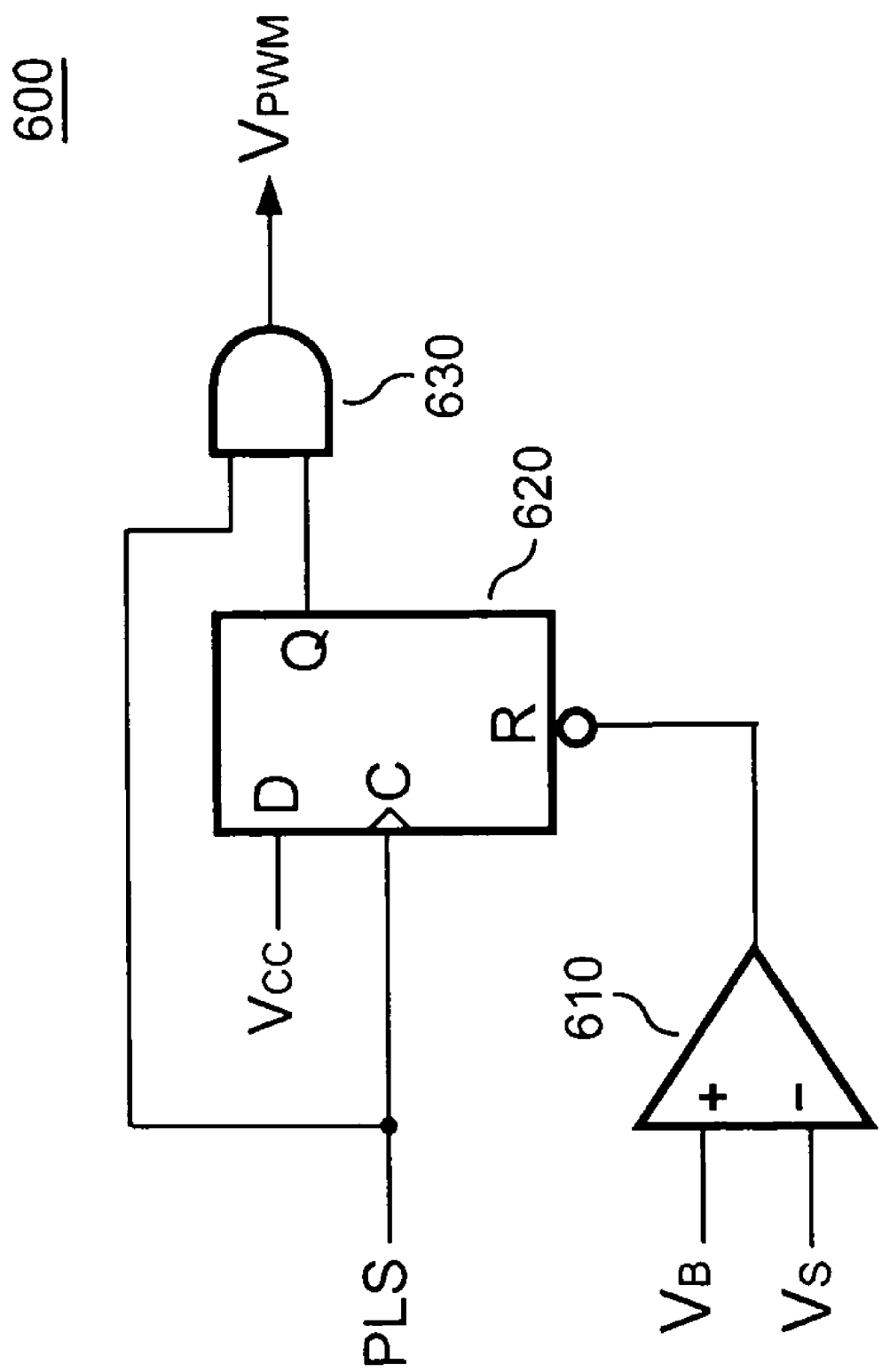
FIG. 6 shows a PWM control circuit.

FIG. 6 shows an embodiment of the PWM control circuit 600 according to the present invention. The PWM control circuit 600 comprises a comparator 610, a D flip-flop 620 and an AND gate 630. The comparator 610 is used to reset the D flip-flop 620. The voltage $V_B$ outputted from the attenuator 500 supplies a positive input of the comparator 610. The switching-current signal $V_S$ supplies a negative input of the comparator 610. A D input of the D flip-flop 620 is pulled high by a supply voltage $V_{CC}$. A clock input of the D flip-flop 620 is supplied with the oscillation signal PLS. A first input of the AND gate 630 is supplied with the oscillation signal PLS. A second input of the AND gate 630 is connected to an output of the D flip-flop 620. An output of the AND gate 630 generates the switching signal $V_{PWM}$.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A switching controller having frequency hopping, comprising:
    a clock generator, for generating a clock signal;
    a pattern generator, for generating a digital pattern code in response to said clock signal;
    an oscillator, for determining a switching frequency of a switching signal, wherein said switching signal is utilized to regulate an output of a power supply, and wherein said switching signal is synchronized with said clock signal;
    a programmable capacitor, coupled to said oscillator for modulating said switching frequency in response to said digital pattern code;
    an attenuator, coupled to a voltage feedback loop for attenuating a feedback signal, wherein said feedback signal is utilized to control the pulse width of said switching signal; and
    a programmable resistor, connected to said attenuator for programming an attenuation rate of said attenuator in response to said digital pattern code.

2. The switching controller having frequency hopping of claim 1, wherein said programmable capacitor comprises:

switching-capacitor sets, connected to each other in parallel, wherein said switching-capacitor sets are formed by couples of switches and capacitors connected in series respectively, wherein said switches are turned on/off by said digital pattern code.

3. The switching controller having frequency hopping of claim 1, wherein said programmable resistor comprises:

switching-resistor sets, connected to each other in parallel, wherein said switching-resistor sets are formed by couples of attenuator switches and attenuator resistors connected in series respectively, wherein said attenuator switches are controlled by said digital pattern code.

4. The switching controller having frequency hopping of claim 1, wherein said oscillator comprises:

a charge-current source, for producing a charge current;

a discharge-current source, for producing a discharge current;

an osc capacitor, connected in parallel with said programmable capacitor;

an osc-charge switch, connected between said charge-current source and said osc capacitor;

an osc-discharge switch, connected between said discharge-current source and said osc capacitor;

a first comparator, wherein a positive input of said first comparator is supplied with an first osc-threshold voltage, a negative input of said first comparator is connected to said osc capacitor;

a second comparator, wherein a negative input of said second comparator is supplied with a second osc-threshold voltage, a positive input of said second comparator is connected to said osc capacitor, and wherein said first osc-threshold voltage is higher than said second osc-threshold voltage;

a first NAND gate, for producing an oscillation signal for determining said switching frequency, wherein a first input of said first NAND gate is driven by an output of said first comparator, and wherein an output of said first NAND gate turns on/off said osc-discharge switch; and a second NAND gate, wherein two inputs of said second NAND gate are respectively connected to said output of said first NAND gate and an output of said second comparator, wherein an output of said second NAND gate is connected to a second input of said first NAND gate, and wherein said output of said second NAND gate turns on/off said osc-charge switch.

5. A switching controller having frequency hopping, comprising:

a clock generator, for generating a clock signal;

a pattern generator, for generating a digital pattern code in response to said clock signal;

an oscillator, for determining a switching frequency of a switching signal, wherein said switching signal is utilized to regulate an output of a power supply, and wherein said switching signal is synchronized with said clock signal;

a programmable capacitor, coupled to said oscillator for modulating said switching frequency in response to said digital pattern code.

6. The switching controller having frequency hopping of claim 5, wherein said programmable capacitor comprises:

switching-capacitor sets, connected to each other in parallel, wherein said switching-capacitor sets are formed by couples of switches and capacitors connected in series respectively, wherein said switches are turned on/off by said digital pattern code.

7. The switching controller having frequency hopping of claim 5, wherein said oscillator comprises:

a charge-current source, for producing a charge current;

a discharge-current source, for producing a discharge current;

an osc capacitor, connected in parallel with said programmable capacitor;

an osc-charge switch, connected between said charge-current source and said osc capacitor;

an osc-discharge switch, connected between said discharge-current source and said osc capacitor;

a first comparator, wherein a positive input of said first comparator is supplied with an first osc-threshold voltage, a negative input of said first comparator is connected to said osc capacitor;

a second comparator, wherein a negative input of said second comparator is supplied with a second osc-threshold voltage, a positive input of said second comparator is connected to said osc capacitor, and wherein said first osc-threshold voltage is higher than said second osc-threshold voltage;

a first NAND gate, for producing an oscillation signal for determining said switching frequency, wherein a first input of said first NAND gate is driven by an output of said first comparator, and wherein an output of said first NAND gate turns on/off said osc-discharge switch; and a second NAND gate, wherein two inputs of said second NAND gate are respectively connected to said output of said first NAND gate and an output of said second comparator, wherein an output of said second NAND gate is connected to a second input of said first NAND gate, and wherein said output of said second NAND gate turns on/off said osc-charge switch.

* * * * *